(12) United States Patent
Reymond et al.

(10) Patent No.: US 11,401,205 B2
(45) Date of Patent: Aug. 2, 2022

(54) SOLAR CONTROL GLAZING COMPRISING TWO LAYERS BASED ON TITANIUM NITRIDE

(71) Applicant: SAINT-GOBAIN GLASS FRANCE, Courbevoie (FR)

(72) Inventors: Vincent Reymond, Antony (FR); Corentin Monmeyran, Le Raincy (FR); Laura Jane Singh, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/413,349

(22) PCT Filed: Dec. 18, 2019

(86) PCT No.: PCT/FR2019/053151
§ 371 (c)(1),
(2) Date: Jun. 11, 2021

(87) PCT Pub. No.: WO2020/128327
PCT Pub. Date: Jun. 25, 2020

(65) Prior Publication Data
US 2022/0024816 A1  Jan. 27, 2022

(30) Foreign Application Priority Data

Dec. 21, 2018  (FR) ...................... 1873764

(51) Int. Cl.
*B32B 27/30*   (2006.01)
*C03C 17/34*   (2006.01)
*B32B 17/10*   (2006.01)

(52) U.S. Cl.
CPC .... *C03C 17/3435* (2013.01); *B32B 17/10036* (2013.01); *B32B 17/10091* (2013.01); *B32B 17/10201* (2013.01); *B32B 27/30* (2013.01); *B32B 2250/03* (2013.01); *B32B 2250/40* (2013.01); *B32B 2255/20* (2013.01); *B32B 2255/28* (2013.01); *B32B 2307/42* (2013.01); *B32B 2315/08* (2013.01); *B32B 2329/06* (2013.01); *B32B 2419/00* (2013.01); *B32B 2605/006* (2013.01); *B32B 2605/08* (2013.01); *C03C 2218/155* (2013.01); *C03C 2218/156* (2013.01)

(58) Field of Classification Search
CPC ........ B32B 17/10036; B32B 17/10091; B32B 17/10201; B32B 2250/03; B32B 2250/40; B32B 2255/20; B32B 2255/28; B32B 2307/42; B32B 2315/08; B32B 2329/06; B32B 2419/00; B32B 2605/006; B32B 2605/08; B32B 27/30; C03C 17/3435; C03C 17/366; C03C 2218/155; C03C 2218/156
See application file for complete search history.

(56) References Cited

U.S. PATENT DOCUMENTS

| | | |
|---|---|---|
| 5,091,244 A | 2/1992 | Biornard |
| 5,216,542 A | 6/1993 | Szczyrbowski et al. |
| 2018/0186691 A1 | 7/2018 | Lu et al. |

OTHER PUBLICATIONS

International Search Report as issued in International Patent Application No. PCT/FR2019/053151, dated Apr. 23, 2020.

*Primary Examiner* — Lawrence D Ferguson
(74) *Attorney, Agent, or Firm* — Pillsbury Winthrop Shaw Pittman LLP

(57) ABSTRACT

Vehicle or building glazing having a solar control property includes a glass substrate supporting a stack of layers, including successively from the surface of the substrate, a first module $M_1$ of layer(s) based on a dielectric material with a total thickness $t_1$, a first layer $TN_1$ including titanium nitride with a thickness of 5 to 35 nanometers, a first module $M_2$ of layer(s) based on a dielectric material with a total thickness $t_2$, a second layer $TN_2$ including titanium nitride with a thickness of 5 to 35 nanometers, a third module $M_3$ of layer(s) based on a dielectric material with a thickness $t_3$. The cumulative sum of the thicknesses of the $TN_1$ and $TN_2$ layers including titanium nitride is greater than 30 nm, $t_1$ being less than 30 nanometers, $t_2$ being between 10 and 100 nm and $t_3$ being greater than 10 nanometers. The ratio $t_1/t_3$ is less than 0.6.

20 Claims, No Drawings

SOLAR CONTROL GLAZING COMPRISING TWO LAYERS BASED ON TITANIUM NITRIDE

CROSS-REFERENCE TO RELATED APPLICATIONS

This application is the U.S. National Stage of PCT/FR2019/053151, filed Dec. 18, 2019, which in turn claims priority to French patent application number 1873764 filed Dec. 21, 2018. The content of these applications are incorporated herein by reference in their entireties.

The invention relates to "solar control" insulating glazing, provided with stacks of thin "functional" layers, that is to say acting on solar and/or thermal radiation essentially by reflection and/or absorption of near infrared (solar) or far infrared (thermal) radiation. The application more particularly targeted by the invention is, firstly, vehicle glazings, such as side windows, sunroofs or rear windows. Without departing from the context of the invention, the present glazing can also be used in the field of the construction industry, as solar control glazing.

"Functional" or also "active" layer is understood to mean, within the meaning of the present patent application, the layers of the stack which confer, on the stack, the bulk of its thermal insulation properties. Generally, stacks made of thin layers equipping the glazing confer on it substantially improved insulation properties very essentially by the intrinsic properties of said active layers. Said layers act on the stream of thermal infrared radiation passing through said glazing, in contrast to the other layers, generally made of dielectric material and generally mainly having the function of chemical or mechanical protection of said functional layers. Dielectric material is understood to mean a material, the bulk impurity-free form of which exhibits a high resistivity, in particular a resistivity initially of greater than $10^{10}$ ohms·meters ($\Omega$·m).

Such glazings provided with stacks of thin layers act on the incident solar radiation either essentially by absorption of the incident radiation by the functional layer(s) or essentially by reflection by these same layers.

They are grouped together under the designation of solar control glazing. They are commercially available and used essentially:
- either to provide essentially protection of the passenger compartment (motor vehicle) or of the dwelling from solar radiation and to prevent overheating thereof, such glazings being described in the industry as solar protection glazings,
- or essentially to provide thermal insulation of the dwelling and to prevent losses of heat, these glazings being described as insulating glazings.

Solar protection is thus understood to mean, within the meaning of the present invention, the property of the glazing of limiting the energy flow, in particular the infrared solar (IRS) radiation, passing through it from the exterior toward the interior of the dwelling or of the passenger compartment.

Thermal insulation is understood to mean a glazing provided with at least one functional layer conferring on it a reduced energy loss, said layer exhibiting properties of reflecting IR radiation of between 5 and 50 micrometers. The functional layers used in this function exhibit a high IR radiation reflection coefficient and are said to be low-emissive (or low-e).

In some countries, the standards imply that the glazings exhibit both solar protection and thermal insulation properties for building glazings.

In another application, such as the motor vehicle industry, it is sometimes desired to limit the amount of heat entering the passenger compartment of the vehicle or entering the building, that is to say to limit the energy transmission of the solar radiation through the glazing.

Generally, all the light and thermal characteristics presented in the present description are obtained according to the principles and methods described in the international standards ISO 9050 (2003) and ISO 10292 (1994), respectively relating to the determination of the light and energy characteristics of the glazings used in glass for the construction industry.

According to another aspect which can also be taken into account in certain applications, when they are combined with the glass substrate, the coatings in addition should also be esthetically pleasing, that is to say that the glazing provided with its stack should exhibit a colorimetry, in particular in internal reflection, which is sufficiently neutral not to inconvenience the passengers of the vehicle or the occupiers of the building in the CIE LAB (L*, a*, b*) colorimetry system. In particular, values of the coefficient a* should be close to 0 in order for the color to be regarded as sufficiently neutral. In particular, excessively high values of the coefficient a* in internal reflection, that is to say on the side of the stack (denoted $a^*_c$ in the continuation of the description), express an intense coloration of the glazing and are to be prohibited, more particularly in the motor vehicle field. The search will thus preferentially be directed, with such an aim, at obtaining glass articles in which the $a^*_c$ parameter is of between −10 and 10, indeed even between −5 and 5.

The coatings are conventionally deposited by deposition techniques of the type of magnetic field-assisted vacuum sputtering of a cathode of the material or of a precursor of the material to be deposited, often known as magnetron sputtering technique in the field. Such a technique is today conventionally used in particular when the coating to be deposited consists of a more complex stack of successive layers of thicknesses of a few nanometers or a few tens of nanometers.

The most effective stacks currently sold to solve the preceding problems and deposited by magnetron sputtering techniques incorporate a metal layer of the silver type operating essentially on the mode of the reflection of a major part of the incident IR (infrared) radiation. These stacks are thus used mainly as glazings of the low-emissive (or low-e) type for the thermal insulation of buildings. However, these layers are very sensitive to moisture and are thus exclusively used in double glazings, on face 2 or 3 thereof, in order to be protected from moisture. The stacks according to the invention do not comprise such layers of the silver type, or indeed of the gold or platinum or indeed copper type. More generally, the stacks according to the invention do not contain such precious metals, or else in very negligible amounts, in particular in the form of unavoidable impurities.

The development of novel stacks is made necessary by certain specific applications or arrangements.

Glazings additionally providing improved visual comfort, in particular in the motor vehicle field (as side window, rear window or also as sunroof), are currently sought in particular. One of the objects of the present invention, in order to respond to such a demand, is to provide suitable thermal insulating glazings in order for the passengers of the vehicle or the occupants of the building equipped with said glazings not to be or to be hardly visible from the outside in the light of the day but to be able on their side to see, without any bother, the external environment.

In addition, for certain specific applications, such as the motor vehicle industry, an additional object of the invention is to provide glazings which meet the above criteria and the color in internal reflection of which is relatively neutral, in particular the coefficient a* in internal reflection ($a^*_c$) of which is between −10 and 10, indeed even between −5 and 5.

According to the results obtained by the applicant company, the above problems have been solved by glass articles as described now.

According to a first aspect, the present invention relates to a vehicle or building glazing, with solar control properties, comprising at least one glass substrate supporting a stack of layers, in which the stack comprises (or consists of), successively from the surface of said substrate: a first module $M_1$, consisting of one or more layer(s) based on dielectric materials, with a total thickness $t_1$, a first layer $TN_1$ comprising titanium nitride with a thickness of between 5 nanometers (nm) and 35 nanometers, a second module $M_2$, consisting of one or more layer(s) based on dielectric materials, with a total thickness $t_2$, a second layer $TN_2$ comprising titanium nitride with a thickness of between 5 nm and 35 nm, a third module $M_3$, consisting of one or more layer(s) based on dielectric materials, with a total thickness $t_3$, in which the cumulative sum of the thicknesses of the $TN_1$ and $TN_2$ layers comprising titanium nitride is greater than 30 nm, in which $t_1$ is less than 30 nm, $t_2$ is of between 10 nm and 100 nm, $t_3$ is greater than 10 nanometers and in which the ratio of the thicknesses $t_1/t_3$ is less than 0.6.

It has been discovered that such articles, exhibiting in particular a light reflection on the side of the stack of layers ($R_{Lc}$) of less than 5% and a difference between the light transmission and the $R_{Lc}$ of less than 30% (the measurement being carried out on a clear monolithic glass on which the stack described above is positioned) made it possible effectively to solve the technical problem described above.

According to preferred embodiments of the present invention, which can, very obviously, if appropriate, be combined with one another:

The thickness $t_2$ of the second module $M_2$ is of between 20 nm and 65 nm, limits included, preferably is of between 25 nm and 60 nm, limits included.

The thickness $t_1$ of the first module $M_1$ is less than 25 nm, in particular of between 1 nm and 25 nanometers, limits included, preferably between 4 nm and 20 nanometers, limits included.

The thickness $t_3$ of the third module $M_3$ is of between 20 nm and 65 nm, limits included, preferably is of between 25 nm and 60 nanometers, limits included, and very preferably is of between 30 nm and 50 nanometers, limits included.

The thickness $TN_1$ of the first layer based on titanium nitride is of between 10 nm and 30 nanometers, limits included, preferably between 15 nm and 25 nanometers, limits included.

The thickness $TN_2$ of the second layer based on titanium nitride is of between 10 nm and 30 nanometers, limits included.

The cumulative thickness $TN_1+TN_2$ of the first layers based on titanium nitride and second layer based on titanium nitride is less than 60 nm, preferably is less than 55 nm.

The ratio of the thicknesses $t_1/t_3$ is less than 0.55.

The coating does not contain a layer based on silver or on gold.

The modules $M_1$, $M_2$ and preferably $M_3$ comprise silicon nitride, in the form of a single layer or of a set of layers, including at least one layer comprising silicon nitride.

$M_1$ comprises a layer comprising silicon nitride.

$M_2$ comprises a layer comprising silicon nitride.

$M_3$ comprises a layer comprising silicon nitride.

The module(s) $M_1$, $M_2$ or $M_3$ comprise materials chosen from a silicon nitride, an aluminum nitride, a tin oxide, a mixed zinc tin oxide, a silicon oxide, a titanium oxide or a silicon oxynitride.

$M_1$ and $M_2$ are single layers.

$M_1$ and $M_2$ and $M_3$ are single layers.

$M_1$ and $M_2$ are based on silicon nitride.

$M_1$, $M_2$ and $M_3$ are based on silicon nitride.

$M_2$ is a single layer based on silicon nitride or is formed essentially of silicon nitride and is in direct contact with the $TN_1$ and $TN_2$ layers based on titanium nitride.

The glass substrate on which the stack is deposited is made of clear glass.

Said coating comprises and preferably consists of the sequence of following layers, starting from the surface of the substrate:

a first layer $M_1$ based on silicon nitride, with a thickness $t_1$ preferably of between 1 nm and 25 nm, preferably between 4 nm and 20 nm, a first layer comprising titanium nitride, with a thickness of between 10 nm and 30 nanometers, a second layer $M_2$ based on silicon nitride, with a thickness $t_2$ of between 20 nm and 65 nm, preferably of between 25 nm and 60 nm, a second layer comprising titanium nitride, with a thickness of between 10 and 30 nanometers, a third single layer $M_3$ based on silicon nitride, with a thickness $t_3$ of greater than 10 nm, in particular of between 20 nm and 65 nanometers, preferably of between 25 nm and 60 nm, or a set of dielectric layers $M_3$, including at least one layer based on silicon nitride with a thickness of greater than 10 nm, in particular of between 25 nm and 60 nanometers.

The glazing comprises two glass substrates assembled by a thermoplastic sheet, said glazing being provided with said stack of layers, said stack preferably being positioned on the face of a substrate facing an exterior surface of said glazing.

The preceding glazing comprises a first glass substrate, preferably colored in its bulk, bonded to a second substrate by an intermediate thermoplastic sheet, in particular made of PVB, said second substrate being made of clear glass and provided with said stack of layers preferably positioned on its face exposed toward the outside of said glazing. Colored in its bulk is understood to mean that the substrate comprises, in its glass composition, elements targeted at conferring a coloration on it (i.e. different from that of a "clear" glass), in particular elements such as cobalt, iron, selenium, indeed even chromium, which can also be targeted at reducing the light transmission thereof.

Said glass substrate(s) are tempered or bent.

Preferably, the layers of titanium nitride are based on titanium nitride or more preferably are formed essentially of titanium nitride.

Titanium-based layers according to the invention comprise, for example, more than 50% by weight of titanium nitride, preferably more than 80% or even more than 90% by weight of titanium nitride.

The titanium nitride according to the invention is not necessarily stoichiometric (Ti/N atomic ratio of 1) but can be super- or substoichiometric. According to an advantageous form, the N/Ti ratio is of between 1 and 1.2. Also, the titanium nitride according to the invention can comprise a minor quantity of oxygen, for example between 1 mol % and 10 mol % of oxygen, in particular between 1 mol % and 5 mol % of oxygen.

According to a particularly preferred form, the titanium nitride layers according to the invention correspond to the general formula $TiN_xO_y$, in which $1.00<x<1.20$ and in which $0.01<y<0.10$.

The dielectric materials, once deposited in thin layers, can, however, comprise additional elements which substantially increase their electrical conductivity, of use, for example, for improving the cathode sputtering yield of the precursor material constituting the magnetron target. The dielectric layers of the modules $M_1$, $M_2$ and $M_3$ according to the invention can be layers based on a material chosen from a silicon nitride, an aluminum nitride, a tin oxide, a mixed zinc tin oxide, a silicon oxide, a titanium oxide or a silicon oxynitride. Preferably, the modules $M_1$, $M_2$ and $M_3$ consist of a single layer and this layer is based on silicon nitride or is formed essentially of silicon nitride. A material based on silicon nitride, tin oxide, mixed zinc tin oxide, silicon oxide, titanium oxide or silicon oxynitride is, for example, a material formed predominantly, for example for more than 50% by weight, preferably for more than 80% or even more than 90% by weight, of such a compound but which can also nevertheless contain other minority elements, in particular as replacement for the cations, in particular in order to promote the deposition thereof in the form of thin layers by the usual techniques of magnetron sputtering as described above. By way of example, the layers according to the present invention made of silicon nitride or of silicon oxynitride, indeed even of silicon oxide, in particular those deposited by magnetron, generally comprise elements of the type Al, Zr, B, and the like, in proportions which can range, for example, up to 10 atom % or even sometimes up to 20 atom %, based on the silicon content of the layer. Likewise, the titanium oxide layers can comprise, as replacement for the titanium, other metal cations such as zirconium, without departing from the scope of the present invention.

The glazing according to the invention can be a single glazing in which the stack of thin layers is positioned on face 2 of the single glazing, the faces of the substrate being numbered from the outside toward the inside of the building or of the passenger compartment which it equips.

According to another embodiment, in particular for use in the motor vehicle field, the glazing according to the invention can be a laminated glazing, comprising two glass substrates assembled by a thermoplastic sheet, said glazing being provided with a stack of layers as is described above. Preferably, the stack is deposited on the face of the substrate facing the interior of the building or of the passenger compartment which it equips.

The substrates and glazings described above can very obviously be tempered if necessary thermally and/or bent.

A process for the manufacture of a glazing according to the invention comprises, for example, at least the following stages:

a glass substrate is introduced into a cathode sputtering device, in a first compartment, at least one underlayer of a dielectric material is deposited, in a subsequent compartment, a titanium target is sputtered by means of a plasma generated from a nitrogen-comprising gas, in a subsequent compartment, at least one intermediate layer of a dielectric material is deposited, in a subsequent compartment, a titanium target is sputtered by means of a plasma generated from a nitrogen-comprising gas, in a subsequent compartment, at least one overlayer of a dielectric material is deposited.

The terms "underlayer" and "overlayer" refer, in the present description, to the respective positions of said layers with respect to the functional layer(s) in the stack, said stack being supported by the glass substrate. In particular, when the stack contains a single underlayer and a single overlayer, the underlayer is the layer in contact with the glass substrate and the overlayer is the outermost layer of the stack, facing away from the substrate.

The term "intermediate layer" denotes the layer(s) positioned between two functional layers.

Thickness of a layer is understood to mean, within the meaning of the present invention, the actual geometric thickness of the layer, as can be measured in particular by conventional electron microscopy techniques or another technique.

The invention and its advantages are described in more detail below, by means of the nonlimiting examples below, which are according to the invention and comparative. In all the examples and the description, unless otherwise specified, the thicknesses given are geometric thicknesses.

All the substrates are made of clear glass with a thickness of 2 mm of Planiclear type sold by Saint-Gobain Glass France. All the layers are deposited in a known way by magnetic field-assisted cathode sputtering (often called magnetron cathode sputtering).

In a well-known way, the different successive layers are deposited in the successive compartments of the cathode sputtering device, each compartment being provided with a specific metal target made of Si or Ti, chosen for the deposition of a specific layer of the stack.

More specifically, the layers of silicon nitride are deposited in compartments of the device from a metallic silicon target (doped with 8% by weight of aluminum), in a reactive atmosphere containing nitrogen. The silicon nitride layers thus also contain aluminum.

The titanium nitride layers are deposited in other compartments of the device from a pure metallic titanium target in a reactive atmosphere containing nitrogen and argon.

The conditions for magnetron deposition of such layers are technically well known in the field.

In the examples which follow, the glass substrate was thus successively covered with a stack of layers comprising two functional layers made of titanium nitride (denoted TiN subsequently for convenience, even if the actual stoichiometry of the layer is not necessarily this) and an underlayer (first layer $M_1$), overlayer (third layer $M_3$) and intermediate layer (second layer $M_2$) made of silicon nitride (denoted $Si_3N_4$ subsequently for convenience, even if the actual stoichiometry of the layer is not necessarily this).

The deposition conditions were adjusted according to conventional techniques for a magnetron deposition in order to obtain different stacks, the sequence of layers of which and their thicknesses (in nanometers nm) are given in table 1 below:

TABLE 1

| Example | $Si_3N_4$ ($M_1$) | TiN ($TN_1$) | $Si_3N_4$ ($M_2$) | TiN ($TN_2$) | $Si_3N_4$ ($M_3$) | $t_1/t_3$ |
|---|---|---|---|---|---|---|
| Example 1 (invention) | 15 | 21 | 49 | 29 | 40 | 0.37 |
| Example 2 (invention) | 5 | 21 | 30 | 13 | 26 | 0.19 |
| Example 3 (invention) | 20 | 23 | 54 | 27 | 37 | 0.54 |
| Example 4 (comparative) | 39 | 16 | 53 | 35 | 65 | 0.60 |
| Example 5 (comparative) | 14 | 20 | 59 | 24 | 8 | 1.75 |
| Example 6 (comparative) | 4 | 18 | 35 | 12 | 8 | 0.50 |
| Example 7 (comparative) | 38 | 8 | 70 | 21 | 45 | 0.85 |

A—Measurement of the Characteristics of the Glazings

The thermal and optical characteristics of the glazings were measured according to the following principles and standards:

1°) Optical Properties:

The measurements are carried out in accordance with the European standard ISO 9050 (2003). More specifically, the light transmission $T_L$ and the light reflection on the side of the stack $R_{Lc}$ are measured between 380 and 780 nm according to the illuminant D65.

The parameter $a*_c$ (stack side in internal reflection) is measured according to the (L, a*, b*) colorimetry model.

2°) Thermal Properties:

The thermal insulation properties of the glazing are evaluated by determination of the emissivity at normal incidence $\varepsilon_n$ measured on the interior face of the substrate covered with the stack of layers, according to the conditions described in the standard ISO 10292 (1994), Annex A.

The light transmission $T_L$, $a*_c$, reflection $R_{Lc}$ and normal emissivity $\varepsilon_n$ values (in percentages) are measured for the glazing provided with the stack.

B—Results

The results obtained for the monolithic glazings according to the examples described above are grouped together in table 2, which follows:

TABLE 2

| Example | $R_{Lc}$ | $a*_c$ | $T_L$ | $T_L - R_{Lc}$ | $\varepsilon_n$ |
|---|---|---|---|---|---|
| 1 (inv.) | 2 | 1.5 | 21 | 19 | <0.35 |
| 2 (inv.) | 5 | 3 | 31 | 26 | <0.35 |
| 3 (inv.) | 3 | -2.1 | 21 | 18 | <0.35 |
| 4 (comp.) | 12 | 0 | 19 | 7 | <0.35 |
| 5 (comp.) | 20 | 4 | 21 | 11 | <0.35 |
| 6 (comp.) | 12 | 2 | 32 | 20 | <0.35 |
| 7 (comp.) | 3 | -14 | 41 | 38 | <0.35 |

It is observed that the single glazings obtained according to the invention (examples 1 to 3) exhibit a very low light reflection (less than 5%) without, however, the light transmission being excessively high, as is shown by the relatively small difference between the $T_L$ and the $R_{Lc}$. Such characteristics make such glazings suitable for a use making possible an unobstructed view of the outside of the vehicle for the occupants of the vehicle or of the building equipped with such glazings.

Examples 4 to 6 exhibit an excessively great reflection which confers an undesirable mirror effect on the glazing in the desired application.

Example 7 exhibits a difference between the $T_L$ and the $R_{Lc}$ which is too high, which does not guarantee optimum visual comfort, in the sense described above, in particular in a motor vehicle use, as described subsequently. In addition, this high $T_L$ is necessarily accompanied by a noticeable increase in the energy transmission $T_E$, which can cause very rapid overheating of the passenger compartment under conditions of strong illumination.

Example 7 additionally exhibits an excessively high value for its $a*_c$ parameter, which expresses an intense coloration of the glazing visible to the occupants which is not desired in certain applications, in particular in the motor vehicle field.

According to the following additional examples in which it is sought to obtain sunroofs for motor vehicles, the single glazings of examples 1 to 7 are assembled with a glazing colored in its bulk and sold by the applicant company under the reference Venus VG10® (with a $T_L$ of approximately 10%), with a thickness of 2 mm. The assembling is obtained by means of a non-tinted polyvinyl butyral (PVB) sheet with a thickness of 0.38 mm, in such a way that the stack of layers is found on the outside of the laminated glazing thus obtained.

The $R_{Lc}$ and $T_L$ parameters are measured on the final laminated glazing as described above. The results are given in table 3 below:

TABLE 3

| Example | $R_{Lc}$ | $a*_c$ | $T_L$ | $\varepsilon_n$ |
|---|---|---|---|---|
| 1 (inv.) | 1 | 2 | 6 | <0.35 |
| 2 (inv.) | 4 | 3.5 | 9 | <0.35 |
| 3 (inv.) | 3 | -2 | 6 | <0.35 |
| 4 (comp.) | 13 | 0 | 5 | <0.35 |
| 5 (comp.) | 20 | 0 | 6 | <0.35 |
| 6 (comp.) | 12 | 2 | 9 | <0.35 |
| 7 (comp.) | 2 | -18 | 12 | <0.35 |

The optical and energy characteristics of the glazings according to the invention given in table 3 are ideal for their use as a sunroof for a motor vehicle and combine very low $T_L$ and $R_{Lc}$ values. The use of a glazing according to examples 4 to 6 is expressed by an excessively high light reflection. The $T_L$ value of the glazing of example 7, for such an application, appears a little too high.

Just as for the monolithic glazing, the laminated glazing according to example 7 additionally exhibits an excessively high value for its $a*_c$ parameter, which expresses a strong coloration which is not desired in certain applications, such as the motor vehicle field.

The invention claimed is:

1. A vehicle or building glazing having solar control properties comprising at least one glass substrate provided with a stack of layers, in which the stack of layers successively comprises, from a surface of said substrate:

a first module $M_1$ consisting of a layer based on a dielectric material with a thickness $t_1$ or of a set of layers based on dielectric materials with a cumulative thickness $t_1$, a first layer $TN_1$ comprising titanium nitride, with a thickness of between 5 nanometers and 35 nanometers, a second module $M_2$ consisting of a layer based on a dielectric material with a thickness $t_2$ or of a set of layers based on dielectric materials with a cumulative thickness $t_2$, a second layer $TN_2$ comprising titanium nitride, with a thickness of between 5 nanometers and 35 nanometers, a third module $M_3$ consisting of a layer based on a dielectric material with a thickness $t_3$ or of a set of layers based on dielectric materials with a cumulative thickness $t_3$, in which a cumulative sum of the thicknesses of the $TN_1$ and $TN_2$ layers comprising titanium nitride is greater than 30 nm, in which $t_1$ is less than 30 nanometers, $t_2$ is of between 10 nm and 100 nm and $t_3$ is greater than 10 nanometers and in which a ratio of the thicknesses $t_1/t_3$ is less than 0.6.

2. The vehicle or building glazing as claimed in claim 1, in which the thickness $t_2$ of the second module $M_2$ is of between 20 nm and 65 nm, limits included.

3. The vehicle or building glazing as claimed in claim 1, in which the thickness $t_1$ of the first module $M_1$ is of between 1 nm and 25 nanometers, limits included.

4. The vehicle or building glazing as claimed in claim 1, in which the thickness $t_3$ of the third module $M_3$ is of between 20 nm and 65 nanometers, limits included.

5. The vehicle or building glazing as claimed in claim 1, in which the thickness $TN_1$ of the first layer based on titanium nitride is of between 10 nm and 30 nanometers, limits included.

6. The vehicle or building glazing as claimed in claim 1, in which the thickness $TN_2$ of the second layer based on titanium nitride is of between 10 nm and 30 nanometers, limits included.

7. The vehicle or building glazing as claimed in claim 1, in which the ratio of the thicknesses $t_1/t_3$ is less than 0.55.

8. The vehicle or building glazing as claimed in claim 1, in which the stack of layers does not contain a layer based on silver or on gold.

9. The vehicle or building glazing as claimed in claim 1, in which the first module $M_1$, the second module $M_2$ or the third module $M_3$ comprise materials chosen from a silicon nitride, an aluminum nitride, a tin oxide, a mixed zinc tin oxide, a silicon oxide, a titanium oxide or a silicon oxynitride.

10. The vehicle or building glazing as claimed in claim 1, in which said first module M1 said second module M2 and said third module M3 all comprise a layer comprising silicon nitride.

11. The vehicle or building glazing as claimed in claim 1, in which the first module $M_1$ and the second module $M_2$ are single layers.

12. The vehicle or building glazing as claimed in claim 1, in which the first module $M_1$ and the second module $M_2$ are based on silicon nitride.

13. The vehicle or building glazing as claimed in claim 1, in which the glass substrate is made of clear glass.

14. The vehicle or building glazing as claimed in claim 1, in which said stack of layers comprises or consists of the sequence of following layers, starting from the surface of the substrate:
a first layer $M_1$ based on silicon nitride,
a first layer comprising titanium nitride, with a thickness of between 10 nm and 30 nanometers,
a second layer $M_2$ based on silicon nitride, with a thickness $t_2$ of between 20 nm and 65 nm,
a second layer comprising titanium nitride, with a thickness of between 10 and 30 nanometers,
a third single layer $M_3$ based on silicon nitride, with a thickness $t_3$ of greater than 10 nm, or a set of dielectric layers $M_3$, including at least one layer based on silicon nitride with a thickness of greater than 10 nm.

15. The vehicle or building glazing as claimed in claim 1, comprising two glass substrates assembled by a thermoplastic sheet, said glazing being provided with said stack of layers.

16. The vehicle or building glazing as claimed in claim 15, comprising a first glass substrate bonded to a second substrate by an intermediate thermoplastic sheet, said second substrate being made of clear glass and provided with said stack of layers positioned on its face exposed toward the outside of said vehicle or building.

17. The vehicle or building glazing as claimed in claim 1, in which said glass substrate is tempered or bent.

18. The vehicle or building glazing as claimed in claim 10, in which said first module M1, said second module M2 and said third module M3 each consist of a single layer comprising silicon nitride.

19. The vehicle or building glazing as claimed in claim 14, in which the first layer $M_1$ based on silicon nitride has a thickness $t_1$ preferably of between 1 nm and 25 nm.

20. The vehicle or building glazing as claimed in claim 14, in which the thickness $t_3$ of the third single layer $M_3$ is between 20 nm and 65 nanometers, or the at least one layer based on silicon nitride of the set of dielectric layers $M_3$ has a thickness between 25 nanometers and 60 nanometers.

* * * * *